United States Patent
Ayrapetian et al.

(10) Patent No.: US 10,109,294 B1
(45) Date of Patent: Oct. 23, 2018

(54) ADAPTIVE ECHO CANCELLATION

(71) Applicant: Amazon Technologies, Inc., Seattle, WA (US)

(72) Inventors: Robert Ayrapetian, Morgan Hill, CA (US); Philip Ryan Hilmes, San Jose, CA (US); Yuwen Su, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 134 days.

(21) Appl. No.: 15/081,155

(22) Filed: Mar. 25, 2016

(51) Int. Cl.
*G10L 21/0364* (2013.01)
*G10L 25/84* (2013.01)
*G10L 21/0208* (2013.01)
*G10L 25/78* (2013.01)

(52) U.S. Cl.
CPC .......... *G10L 21/0364* (2013.01); *G10L 25/84* (2013.01); *G10L 2021/02082* (2013.01); *G10L 2025/783* (2013.01)

(58) Field of Classification Search
CPC ....... G10L 21/0364; G10L 2021/02082; G10L 25/84; G10L 2025/783
See application file for complete search history.

(56) References Cited

U.S. PATENT DOCUMENTS

| | | | |
|---|---|---|---|
| 5,689,556 A * | 11/1997 | Gupta | H04B 3/23 370/286 |
| 2011/0032827 A1 * | 2/2011 | Susan | H04Q 1/457 370/241 |
| 2017/0083285 A1 * | 3/2017 | Meyers | G10L 15/063 |
| 2017/0214720 A1 * | 7/2017 | Inamdar | H04L 65/1066 |

* cited by examiner

Primary Examiner — Regina N. Holder
(74) Attorney, Agent, or Firm — Pierce Atwood LLP (57) ABSTRACT

Systems and methods for disabling adaptive echo cancellation functionality for a temporal window are provided herein. In some embodiments, audio data may be received by a voice activated electronic device, where the audio data may include an utterance of a wakeword that may be subsequently followed by additional speech. A start time of when the wakeword began to be uttered may be determined by the voice activated electronic device, and the voice activated electronic device may also send the audio data to a backend system. Adaptive echo cancellation functionality may be disabled at the start time. The backend system may determine an end time of the speech, and may provide an indication to the voice activated electronic device of the end time, which in turn may cause the voice activated electronic device to enable the adaptive echo cancellation functionality at the end time.

20 Claims, 7 Drawing Sheets

ADAPTIVE ECHO CANCELLATION

BACKGROUND

Electronic devices, such as voice activated electronic device and manually activated electronic devices, are becoming more and more prevalent in modern society. Voice activated electronic devices are relatively new, but becoming more common. Activation of specific functionality of such devices typically occurs when a preconfigured wakeword is detected. Described herein are technical solutions to improve voice activated electronic devices.

DETAILED DESCRIPTION

The present disclosure, as set forth below, is generally directed to various embodiments of methods and devices related to suspending adaptation of adaptive echo cancellation during a speech interval time period. A speech interval time period, as described herein, can refer to a temporal window during which speech is uttered. For example, a speech interval time period may correspond to a temporal window beginning at a first utterance of a wakeword, and ending after any subsequent speech has finished being uttered. As another example, a speech interval time period may correspond to a temporal window beginning after a wakeword's utterance, and ending after any subsequent speech has finished being uttered. As still yet another example, a speech interval time period may correspond to a temporal window beginning in response to a user input, such as pressing a button, and ending after any speech has finished being uttered, or after a predefined amount of time has elapsed after the user input.

Adaptive echo cancellation, which is sometimes also referred to as adaptive acoustic echo cancellation or adaptive acoustic echo suppression, may be used to reduce or cancel an amount of internal feedback detected by a microphone from sound that is output from a speaker, as well as sound detected due to audio reflections of surrounding objects, during a particular temporal window. Adaptive echo cancellation may function to reduce the effects of, or cancel, acoustic echoes, such as an echo generated from a speaker of an electronic device such that may also be detectable by a microphone of the electronic device. An environment and characteristics corresponding to a voice activated controlled electronic device location may affect acoustic echoes received by the voice activated electronic device's microphone. A voice activated electronic device may use adaptive echo cancellation to regularly update one or more parameters, such as filtering coefficients, in a process referred to as adaptation. Eventually, a set of parameters that allows for effective cancellation of acoustic echoes resulting from a microphone's input signal may be determined based on the regular updates to these parameters obtained using adaptive echo cancellation.

In some embodiments, adaptive echo cancellation for an electronic device may be selectively disabled. For example, audio data may be received by a sound controlled electronic device. The sound controlled electronic device may, in this particular example, determine that the audio data includes an utterance of a wakeword for the sound controlled electronic device. In response to determining that the audio data includes an utterance of the wakeword, a start time of the wakeword within the audio data may be determined. In some embodiments, an end time may be determined based on a time that the subsequent speech detected after the wakeword's utterance concludes. Adaptive echo cancellation may then be disabled during a temporal window beginning from the start time and ending at the end time. Furthermore, in some embodiments, adaptive echo cancellation may be enabled again at the end of the temporal window.

As used herein, a sound controlled electronic device may correspond to a device capable of being activated in response to detection of a specific sound (e.g., a word, a phoneme, a phrase or grouping of words, or any other type of sound, or any series of temporally related sounds). For example, a voice activated electronic device, as mentioned above, may be one type of sound controlled electronic device. In some embodiments, such voice activated electronic devices may output audio that includes the sound that caused the voice activated electronic device to become activated.

Spoken user commands may be prefaced by a wakeword, which is also sometimes referred to as a trigger expression, wake expression, or activation word. In response to detecting the wakeword, a voice activated electronic device may be configured to detect and interpret any words that subsequently follow the wakeword as actionable inputs or commands. In some embodiments, however, the voice activated electronic device may be activated by a phrase or grouping of words, which the voice activated electronic device may also be configured to detect, and therefore the voice activated electronic device may also be able to detect and interpret any words subsequently following that phrase. The voice activated electronic device itself may detect and interpret the words that subsequently follow the detected wakeword or it may communicate the received words to a remote electronic device(s), such as a backend system or cloud-based system, that detects and interprets the words. The words that subsequently follow the wakeword are often referred to as an utterance or a command.

Another example of a sound controlled device may correspond to a sound activated electronic device. A sound activated electronic device may, in some embodiments, be activated by the detection of a non-verbal sound, such as an ultrasonic, subsonic or audible sound generated by another electronic device (e.g., sound-based communications protocol, water faucet, toilet, coffee machine, washing machine, dish washer, laboratory equipment, manufacturing equipment, automobile, garage door opener, etc.), pet/animal (e.g., barking), person/animal interacting with objects (e.g., glass breaking, door closing, footsteps on floor, etc.), etc.

A manually activated electronic device, as described herein, may be a device capable of being activated in response to a manual input from an individual (e.g., pressing a button, touching a portion of a touch screen, performing an action on a device). For example, a tap-to-talk electronic device is one type of manually activated electronic device. Such tap-to-talk electronic devices, for instance, are capable of obtaining and outputting audio data in response to a button being pressed by an individual.

Figure 1:
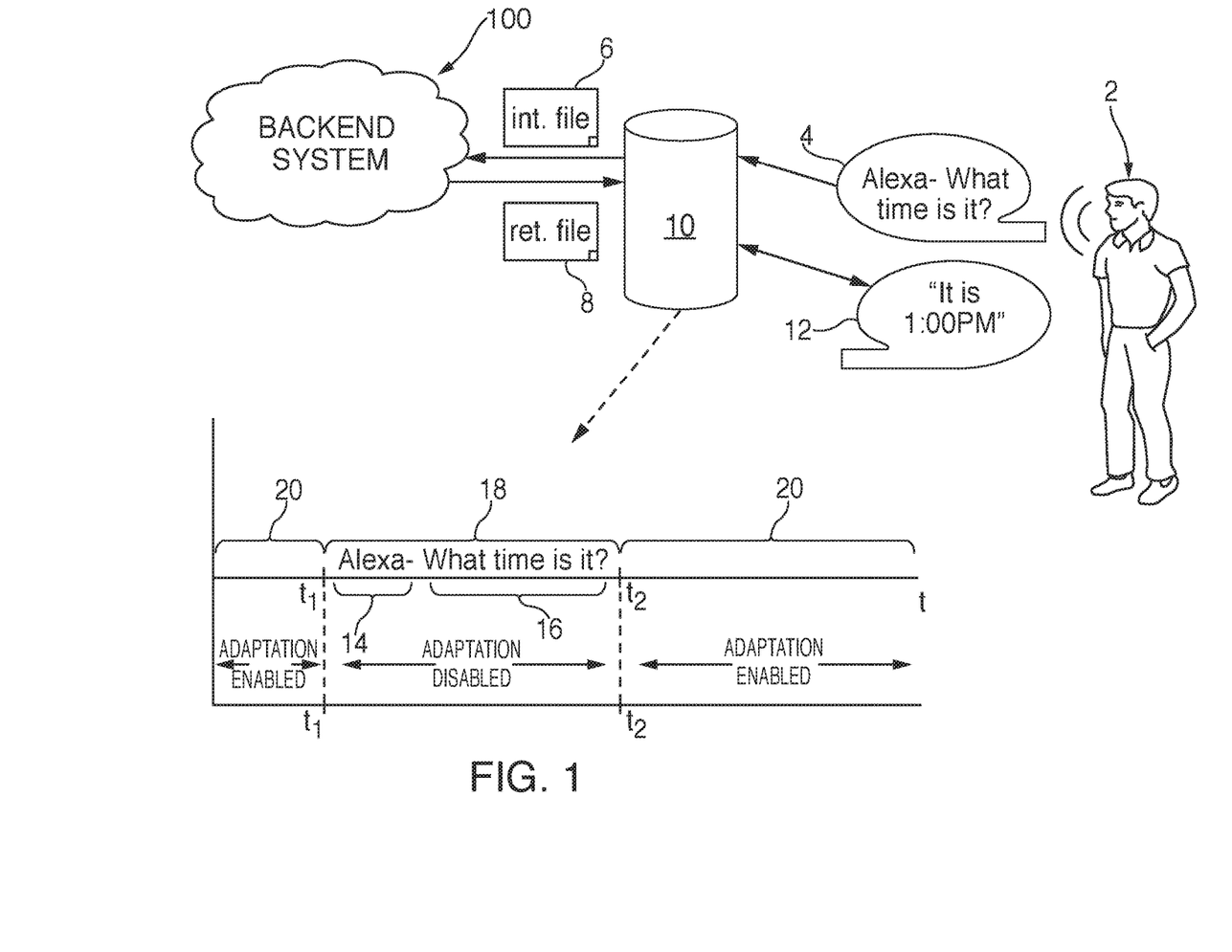
FIG. 1 is an illustrative diagram of a system for disabling acoustic echo cancellation during a temporal window, in accordance with various embodiments.

FIG. 1 is an illustrative diagram of a system for disabling acoustic echo cancellation during a temporal window, in accordance with various embodiments. In one exemplary non-limiting embodiment, an individual 2 may speak command 4 within a remote environment where a voice activated electronic device 10, as described in greater detail below, is located. Command 4 may include an utterance of a wakeword 14 (e.g. "Alexa"), followed by a question 16. Command 4 may correspond to any question, inquiry, instruction, phrase, or any other set of one or more words/sounds. For example, individual 2 may say, "Alexa—What time is it?" However, alternative or additional commands may include, but are not limited to, "Alexa—What is the weather like today?", or "Alexa—How far away is the Moon?" A temporal window beginning from a start of the utterance of wakeword 14 and ending after question 16 (e.g., a time period corresponding to a start and end of command 4) may, as described above, be referred to as speech time interval 18.

Voice activated electronic device 10 may detect an utterance of wakeword 14, such as "Alexa," or "Amazon," within command 4, and may interpret subsequent user speech as being directed to voice activated electronic device 10 using one or more audio input devices (e.g., one or more microphones and/or transducers). In particular, wakeword 14 may be detected within an audio signal received by one or more microphones located on voice activated electronic device 10, however persons of ordinary skill in the art will recognize that the one or more microphones may alternatively be located on a separate device in communication with voice activated electronic device 10. Generally, a portion of the audio data may enable certain functionalities of electronic device 10. For example, a wakeword may be included within a portion of audio data received by voice activated electronic device 10, which in turn causes voice activated electronic device 10 to record the audio data (e.g., the wakeword, the wakeword plus subsequent utterances following the wakeword's utterance, or the subsequent utterances following the wakeword's utterance), and send the audio data to backend system 100.

After wakeword 14 is detected, voice activated electronic device 10 may continue to capture audio, such as spoken directions from individual 2. The duration of question 16 may also be determined using voice activated electronic device 10. In some embodiments, voice activated electronic device 10 may transmit captured audio data to backend system 100 for interpretation/analysis and backend system 100 may determine a temporal duration of question 16. In some embodiments, voice activated electronic device 10 may capture audio for a pre-defined period of time after wakeword 14 is detected (e.g., 5 seconds, 10 seconds, 30 seconds, etc.). However, in other embodiments, voice activated electronic device 10 may cyclically capture audio for pre-defined amounts of time (e.g., 5 seconds, 10 seconds, 15 seconds, etc.), and may delete that captured audio so long as wakeword 14 is not determined to be included in that particular time period.

As used herein, the term "wakeword," such as wakeword 14 may also correspond to a "keyword" or "key phrase," an "activation word" or "activation words," or a "trigger," "trigger word," or "trigger expression." Persons of ordinary skill in the art will recognize that the aforementioned wakeword, "Alexa," is merely exemplary, and any word (e.g., "Amazon"), series of words (e.g., "Wake Up" or "Hello, Alexa") may be used as wakeword 14. Furthermore, wakeword 14 may be set or programmed by individual 2, and, in some embodiments, voice activated electronic device 10 may have more than one wakeword (e.g., two or more different wakewords) that may each activate voice activated electronic device 10. Furthermore, the trigger that is used, such as wakeword 14, to activate voice activated electronic device 10 may be any series of temporally related sounds.

In some embodiments, the trigger expression may be a non-verbal sound. For example, the sound of a door opening, an alarm going off, glass breaking, a telephone ringing, or any other sound may alternatively be user to activate device 10. In this particular scenario, detection of the non-verbal sound by device 10, which alternatively may be described as a sound activated electronic device, which may be substantially similar to voice activated electronic device 10, may cause a certain action or response to occur. For example, if the sound of a door opening is detected, which is also the sound activated device's trigger, that detected trigger may cause a burglar alarm to turn on.

Furthermore, in some embodiments, electronic device 10 may correspond to a manually activated electronic device. In this particular scenario, the manually activated electronic device may be activated in response to a user input, such as the pressing of a button, swiping of a screen, or any other actionable input, or any combination thereof. After the user input is detected, audio may begin to be captured. In some embodiments, audio may be captured by the manually activated electronic device for a predefined amount of time, such as a few seconds. However, manually activated electronic device may also record audio data until speech is no longer detected by one or more microphones of the manually activated electronic device.

As an illustrative example, electronic device 10 may be a push-to-talk or tap-to-talk device. In this particular scenario, an individual, such as individual 2, may provide an input that activates device 10. In response to being activated, the manually activated electronic device may begin capturing audio data, and may send that captured audio data to backend system 100 for analysis and/or processing.

The captured audio may be sent to backend system 100 from voice activated electronic device 10 in the form of initial file 6. Initial file 6 may include the recorded audio data representing command 4, as well as one or more pieces of additional data, such as a time and/or date that command 4 was said, a location of voice activated electronic device 10 (e.g., a GPS location), an IP address associated with voice activated electronic device 10, a type of device that voice activated electronic device 10 is, or any other information, or any combination of information. For example, when individual 2 says command 4, voice activated electronic device 10 may obtain a GPS location of device 10 to determine a location of individual 2 as well as a time/date (e.g., hour, minute, second, day, month, year, etc.) when command 4 was made.

Initial file 6 may be sent (e.g. transmitted) over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice activated electronic device 10 and backend system 100. In some embodiments, voice activated electronic device 10 and backend system 100 may communicate with one another via a web browser using HTTP. Various additional communication protocols may be used to facilitate communications between voice activated electronic device 10 and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more servers, each in communication with one another and/or voice activated electronic device 10. Each server within backend system 100 may be associated with one or more databases or processors that are capable of storing, retrieving, processing, analyzing, and/or generating data to be provided to voice activated electronic device 10. For example, backend system 100 may include one or more game servers for storing and processing information related to different games (e.g., "Simon Says," karaoke, etc.). As another example, backend system 100 may include one or more weather servers for storing weather information and/or providing weather information to voice activated electronic device 10. Backend system 100 may, in some embodiments, correspond to a collection of servers located within a remote facility, and individuals may store data on backend system 100 and/or communicate with backend system 100 using one or more of the aforementioned communications protocols.

Upon receipt of initial file 6, backend system 100 may perform various actions based on, and in response to, command 4. For instance, backend system 100 may convert the audio data representing command 4 into text data, and may use the text data to determine the word(s) included within command 4. Furthermore, backend system 100 may also include automatic speech recognition and natural language understanding function thereon to process and analyze the audio data representing command 4. After the word(s) are determined, an appropriate server or servers of backend system 100 may be accessed to retrieve or obtain a response to command 4 from a specific server (or skill). Backend system 100 may also include one or more computing devices in communication with the one or more servers of backend system 100, and may include one or more processors, communication circuitry (including any circuitry capable of using any of the aforementioned communications protocols), and/or storage/memory. Backend system 100 may also include various modules that store software, hardware, logic, instructions, and/or commands for backend system 100 to perform, such as, for example, a speech-to-text ("STT") module, a text-to-speech ("TTS") module, or other modules. A more detailed description of backend system 100 is provided below.

The audio data may be analyzed to determine what command, action, or instruction individual 2 said within command 4. While techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. In some embodiments, one or more filters may be applied to the received audio data to reduce or minimize extraneous noise.

After the audio data is analyzed, a response or answer, such as speech, audio, or instructions for any other type of output may be sent (e.g. transmitted) from backend server 100 to the voice activated electronic device 10 in the form of return file 8. Return file 8 may include additional information such as, for example, information on a temporal location of an end time of question 16, and in particular an end time corresponding to question 16 of command 4. The information may be, for example, metadata such as a flag located at a selected location in audio data, or information on where to place the flag in the audio data. Once received by voice activated electronic device 10, the audible message 12 may output through one or more speakers of voice activated electronic device 10. For example, voice activated electronic device 10 may output audible message 12, such as "It is 1:00 PM."

Voice activated electronic device 10 may, in some embodiments, include adaptive echo cancellation for filtering audio data received by voice activated electronic device 10. Audio that is received by voice activated electronic device 10 may automatically configure one or more parameters or settings of the adaptive echo cancellation. In some embodiments, adaptive echo cancellation may include associating one or more filtering coefficients based on audio received by voice activated electronic device 10. The various filtering coefficients, furthermore, may continually update based on the audio data received by voice activated electronic device 10. In some embodiments, even if adaptive echo cancellation is disabled, the audio data may continue to be filtered. However, in this particular scenario, adaptive echo cancellation may update itself upon adaptive echo cancelled being enabled again.

Together, voice activated electronic device 10 and backend system 100 may determine a temporal duration of speech time interval 18 (i.e., a temporal window beginning from a start of an utterance of wakeword 14 and ending at an end of an utterance of question 16). For example, voice activated electronic device 10 determines a start time $t_1$ of wakeword 14, while backend system 100 may determine an end time $t_2$ of question 16. A temporal duration corresponding to a difference between start time $t_1$ and end time $t_2$ may correspond to speech time interval 18. Voice activated electronic device 10 may, in some embodiments, control adaptive echo cancellation such that adaptive echo cancellation may be disabled during speech time interval 18 and then enabled again during non-speech time intervals 20. By disabling adaptation of adaptive echo cancellation during speech interval 18, wakeword 14 and question 16 may be prevented from diverging and adapting and learning to cancel wakeword 14 or question 16, thereby improving an accuracy of the detection and recognition of wakeword 14 and question 16 within command 4.

In some embodiments, the adaptation process may be configured such that the updating of the one or more filtering coefficients based on audio received is disabled for the temporal window. For instance, command 4 may be buffered to backend system 100 such that there is a slight delay (e.g., a few milliseconds). During that delay, the start time of the temporal window may be determined such that adaptive echo cancellation may be disabled (e.g., no updating of the filter coefficients) due to any audio detected by electronic device 10 starting after the start time $t_1$. Electronic device 10 may be provided with end time $t_2$ after backend system 100 has determined it, such that electronic device 10 may then cause adaptive echo cancellation to be enabled again starting after end time $t_1$.

Figure 2:
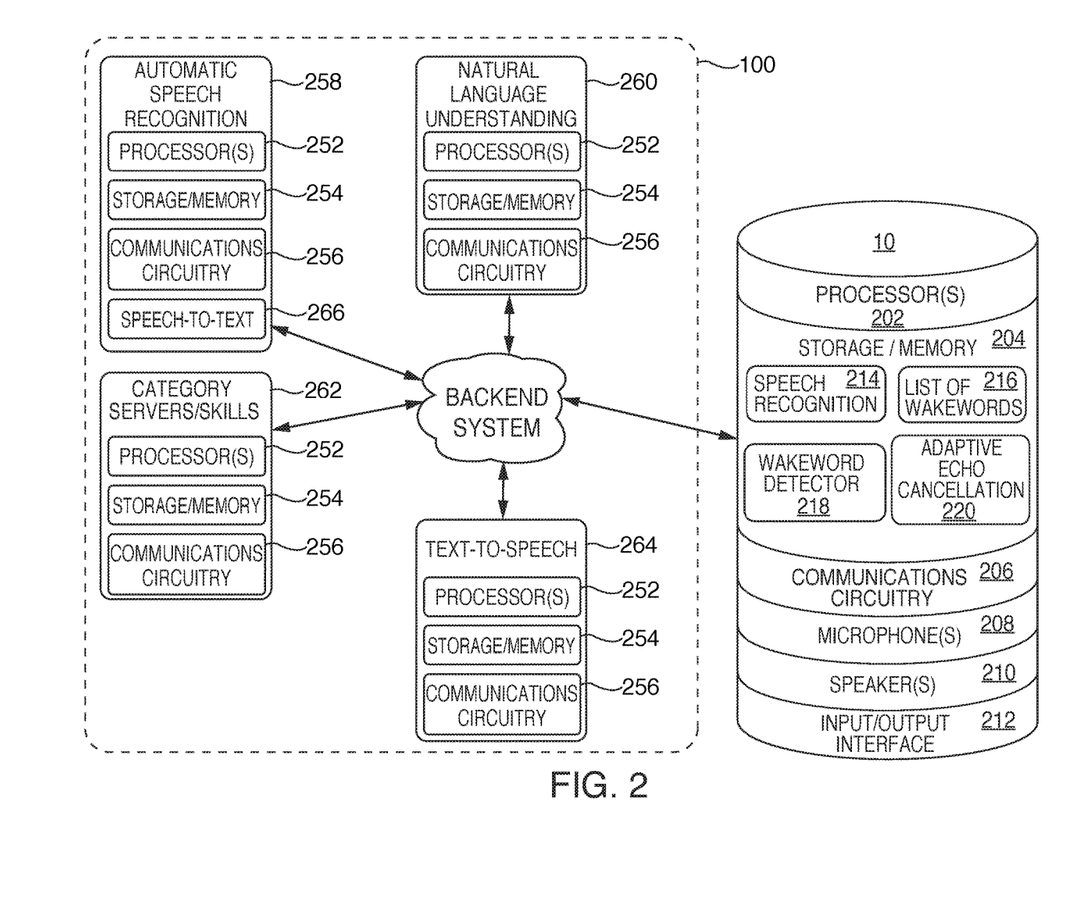
FIG. 2 is an illustrative diagram of the architecture of the system of FIG. 1 in accordance with various embodiments.

FIG. 2 is an illustrative diagram of the architecture of the system of FIG. 1 in accordance with various embodiments. Voice activated electronic device 10, in some embodiments, may correspond to any type of electronic device capable of activated in response to detecting a specific sound. Voice activated electronic device 10 may, in some embodiments, after detecting the specific sound (e.g., a wakeword or trigger), recognize commands (e.g., audio commands, inputs) within captured audio, and may perform one or more actions in response to the received commands. Various types of electronic devices may include, but are not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, voice activated electronic device 10 may be relatively simple or basic in structure such that no mechanical input option(s) (e.g., keyboard, mouse, trackpad) or touch input(s) (e.g., touchscreen, buttons) may be provided. For example, voice activated electronic device 10 may be able to receive and output audio, and may include power, processing capabilities, storage/memory capabilities, and communication capabilities.

Voice activated electronic device 10 may include a minimal number of input mechanisms, such as a power on/off switch, however primary functionality, in one embodiment, of voice activated electronic device 10 may solely be through audio input and audio output. For example, voice activated electronic device 10 may listen for a wakeword by continually monitoring local audio. In response to the wakeword being detected, voice activated electronic device 10 may establish a connection with backend system 100, send audio data to backend system 100, and await/receive a response from backend system 100. In some embodiments, however, non-voice activated electronic devices may also communicate with backend system 100 (e.g., push-to-talk or tap-to-talk devices). For example, electronic device 10, in one embodiment, corresponds to a manually activated electronic device, and the foregoing descriptions may be equally applicable to a non-voice activated electronic device.

Voice activated electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within voice activated electronic device 10, and/or one or more components may be omitted. For example, voice activated electronic device 10 may include a power supply or a bus connector. As another example, voice activated electronic device 10 may not include an I/O interface. Furthermore, while multiple instances of one or more components may be included within voice activated electronic device 10, for simplicity only one of each component has been shown.

Processor(s) 202 may include any suitable processing circuitry capable of controlling operations and functionality of voice activated electronic device 10, as well as facilitating communications between various components within voice activated electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for voice activated electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice activated electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as speech recognition module 214, list of wakewords database 216, wakeword detection module 218, and adaptive echo cancellation module 220. Speech recognition module 214 may, for example, include an automatic speech recognition ("ASR") component that recognizes human speech in detected audio. Speech recognition module 214 may also include a natural language understanding ("NLU") component that determines user intent based on the detected audio. Also included within speech recognition module 214 may be a text-to-speech ("TTS") component capable of converting text to speech to be outputted by speaker(s) 210, and/or a speech-to-text ("STT") component capable of converting received audio signals into text to be sent to backend system 100 for processing.

List of wakewords database 216 may be a database stored locally on voice activated electronic device 10 that includes a list of a current wakeword for voice activated electronic device 10, as well as one or more previously used, or alternative, wakewords for voice activated electronic device. In some embodiments, individual 2 may set or program a wakeword for voice activated electronic device 10. The wakeword may be programmed directly on voice activated electronic device 10, or a wakeword or words may be set by the individual via a backend system application that is in communication with backend system 100. For example, individual 2 may use their mobile device having the backend system application running thereon to set the wakeword. The specific wakeword may then be communicated from the mobile device to backend system 100, which in turn may send/notify voice activated electronic device 10 of the individual's selection for the wakeword. The selected activation may then be stored in database 216 of storage/memory 204.

Wakeword detection module 218 may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a threshold to determine whether the wakeword will be declared as having been spoken.

In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 10 may then begin transmitting the audio signal to backend system 100 for detecting and responds to subsequent utterances made by individual 2.

Adaptive echo cancellation module 220 may include one or more adaptive echo cancellation filters that filter acoustic echo audio signals from received audio signals. The adaptive echo cancellation filters may automatically adapt based on the acoustic environment in and around voice activated electronic device 10 based on audio received by voice activated electronic device 10. In some embodiments, adaptive echo cancellation module 220 may be configured to enable and disable adaptive echo cancellation for selected time periods. During time periods when adaptation is disabled, adaptive echo cancellation module 200 will may not update the adaptive echo cancellation filtered based on any audio signals received by voice activated electronic device 10, however adaptive echo cancellation module 220 may continue to filter acoustic echo signals from the incoming audio data.

Communications circuitry 206 may include any circuitry allowing or enabling voice activated electronic device 10 to communicate with one or more devices, servers, and/or systems. For example, communications circuitry 206 may facilitate communications between voice activated electronic device 10 and backend system 100. Communications circuitry 206 may use any communications protocol, such as any of the previously mentioned exemplary communications protocols. In some embodiments, voice activated electronic device 10 may include an antenna to facilitate wireless communications with a network using various wireless technologies (e.g., Wi-Fi, Bluetooth®, radiofrequency, etc.). In yet another embodiment, voice activated electronic device 10 may include one or more universal serial bus ("USB") ports, one or more Ethernet or broadband ports, and/or any other type of hardwire access port so that communications circuitry 206 allows voice activated electronic device 10 to communicate with one or more communications networks.

Voice activated electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice activated electronic device 10 may include multiple microphones (e.g., four, seven, ten, etc.) placed at various positions about voice activated electronic device 10 to monitor/capture any audio outputted in the environment where voice activated electronic device 10 is located. The various microphones 208 may include some microphones optimized for distant sounds, while some microphones may be optimized for sounds occurring within a close range of voice activated electronic device 10.

Voice activated electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice activated electronic device 10 may be located. In some embodiments, speaker(s) 210 may include headphones or ear buds, which may be wirelessly connected, or hard-wired, to voice activated electronic device 10, that may be capable of broadcasting audio directly to individual 2.

In some embodiments, voice activated electronic device 10 may be hard-wired, or wirelessly connected, to one or more speakers 210. For example, voice activated electronic device 10 may cause one or more speakers 210 to output audio thereon. In this particular scenario, voice activated electronic device 10 may receive audio to be output by speakers 210, and voice activated electronic device 10 may send the audio to speakers 210 using one or more communications protocols. For instance, voice activated electronic device 10 and speaker(s) 210 may communicate with one another using a Bluetooth® connection, or another near-field communications protocol. In some embodiments, voice activated electronic device 10 may communicate with speaker(s) 210 indirectly. For example, voice activated electronic device 10 may communicate with backend system 100, and backend system 100 may communicate with speaker(s) 210. In this particular example, voice activated electronic device 10 may send audio data representing a command to play audio using speaker(s) 210 to backend system 100, and backend system 100 may send the audio to speaker(s) 210 such that speaker(s) 210 may play the audio thereon.

In some embodiments, one or more microphones 208 may serve as input devices to receive audio inputs, such as speech from individual 2. Voice activated electronic device 10, in the previously mentioned embodiment, may then also include one or more speakers 210 to output audible responses. In this manner, voice activated electronic device 10 may function solely through speech or audio, without the use or need for any input mechanisms or displays.

In one exemplary embodiment, voice activated electronic device 10 includes I/O interface 212. The input portion of I/O interface 212 may correspond to any suitable mechanism for receiving inputs from a user of voice activated electronic device 10. For example, a camera, keyboard, mouse, joystick, or external controller may be used as an input mechanism for I/O interface 212. The output portion of I/O interface 212 may correspond to any suitable mechanism for generating outputs from voice activated electronic device 10. For example, one or more displays may be used as an output mechanism for I/O interface 212. As another example, one or more lights, light emitting diodes ("LEDs"), or other visual indicator(s) may be used to output signals via I/O interface 212 of voice activated electronic device 10. In some embodiments, one or more vibrating mechanisms or other haptic features may be included with I/O interface 212 to provide a haptic response to individual 2 from voice activated electronic device 10. Persons of ordinary skill in the art will recognize that, in some embodiments, one or more features of I/O interface 212 may be included in a purely voice activated version of voice activated electronic device 10. For example, one or more LED lights may be included on voice activated electronic device 10 such that, when microphone(s) 208 receive audio from individual 2, the one or more LED lights become illuminated signifying that audio has been received by voice activated electronic device 10. In some embodiments, I/O interface 212 may include a display screen and/or touch screen, which may be any size and/or shape and may be located at any portion of voice activated electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100, as mentioned previously, may, in some embodiments, be in communication with voice activated electronic device 10. Backend system 100 includes various components and modules including, but not limited to, automatic speech recognition ("ASR") module 258, natural language understanding ("NLU") module 260, skills module 262, and text-to-speech ("TTS") module 264. A speech-to-text ("STT") module may be included in the ASR module 258. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for cloud-based information system 100, such as, a speaker identification ("ID") module, a user profile module, or any other module, or any combination thereof.

ASR module 258 may be configured such that it recognizes human speech in detected audio, such as audio captured by voice activated electronic device 10. ASR module 258 may also be configured to determine an end time of speech included within the received audio data, such as an end time of question 16. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions of the latter may apply. NLU module 260 may be configured such that it determines user intent based on the detected audio received from voice activated electronic device 10. NLU module 260 may include processor(s) 252, storage/memory 254, and communications circuitry 256. In some embodiments, ASR module 258 may include a speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND® speech processing technologies available from the Autonomy Corporation, which is headquartered in Cambridge, England, United Kingdom.

Skills module 262 may, for example, correspond to various action specific skills or servers capable of processing various task specific actions. Skills module 262 may further correspond to first party applications and/or third party applications operable to perform different tasks or actions. For example, based on the context of audio received from voice activated electronic device 10, backend system 100 may use a certain application or skill to retrieve or generate a response, which in turn may be communicated back to voice activated electronic device 10. Skills module 262 may include processor(s) 252, storage/memory 254, and communications circuitry 256. As an illustrative example, skills 262 may correspond to one or more game servers for storing and processing information related to different game (e.g., "Simon Says," karaoke, etc.). As another example, skills 262 may include one or more weather servers for storing weather information and/or providing weather information to voice activated electronic device 10.

TTS module 264 may employ various text-to-speech techniques. Techniques for transcribing speech into text are well known in the art and need not be described in further detail herein, any suitable computer implemented speech to text technique may be used to convert the received audio signal(s) into text, such as SOFTSOUND® speech processing technologies available from the Autonomy Corporation, which is headquartered in Cambridge, England, United Kingdom. TTS module 264 may also include processor(s) 252, storage/memory 254, and communications circuitry 256.

Persons of ordinary skill in the art will recognize that although each of ASR module 258, NLU module 260, skills module 262, and TTS module 264 include instances of processor(s) 252, storage/memory 254, and communications circuitry 256, those instances of processor(s) 252, storage/memory 254, and communications circuitry 256 within each of ASR module 258, NLU module 260, skills module 262, and TTS module 264 may differ. For example, the structure, function, and style of processor(s) 252 within ASR module 258 may be substantially similar to the structure, function, and style of processor(s) 252 within NLU module 260, however the actual processor(s) 252 need not be the same entity.

Figure 3:
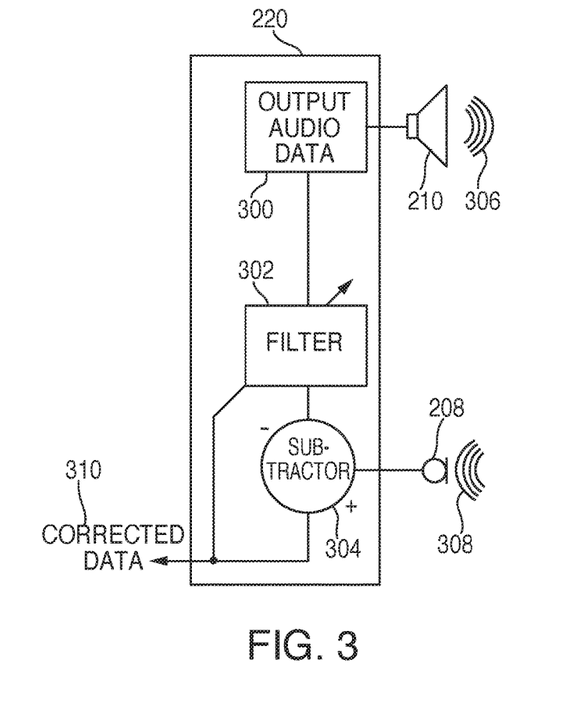
FIG. 3 is an illustrative diagram of an adaptive echo cancellation module in accordance with various embodiments.

FIG. 3 is an illustrative diagram of adaptive echo cancellation module 220 in accordance with various embodiments. Adaptive echo cancellation module 220 may include filter 302 and subtractor 304. Output audio data 300 may be provided to speaker 210 to be output as output audio 306 from voice activated electronic device 10. Output audio data 300 may also be provided to filter 302. Filter 302, in one embodiment, may be adaptive and adaptive echo cancellation module 220 may be configured such that filter 302 can adapt to, or learn, an acoustic transfer function for a local environment of voice activated electronic device 10. As described herein, the acoustic transfer function of the local environment of voice activated electronic device 10 may correspond to a transfer function that enables adaptive echo cancellation module 220 to remove any echoes of audio 306 output by speaker 210 from the audio data associated with audio 308 received by microphone 208. The output of filter 302 may then be subtracted from audio data associated with audio 308 received by microphone 208.

Audio 308 received by microphone 208 may include echoes of audio 306 output by speaker 210. Adaptive echo cancellation module 220 may be configured to reduce any instances echoes of audio 306 output by speaker 210 from the audio data associated with audio 308.

Instead of trying to calculate the transfer function of the local environment, filter 302 may be adaptive such that it is configured to learn the acoustic transfer function's parameters over time through the use of feedback. For example, after subtracting the output of filter 302 from the audio data associated with audio 308, a resultant signal may be filtered, via filter 302, using the inverse of the transfer function. If all echoes are removed, the result of the inverse filtering should be zero. Any residual value of the inverse filtering may be used to update the transfer function of filter 302 by, for example, updating coefficients associated with the transfer function of filter 302 to more closely approximate the acoustic transfer function of the environment in and around voice activated electronic device 10. Over time, filter 302 may adapt and converge on an acoustic transfer function indicative of the local environment of voice activated electronic device 10. The output of adaptive echo cancellation module 220 may, in some embodiments, be corrected audio data 310. Corrected audio data 310 may correspond to audio data from which removes or reduces echoes of audio 306 output by speaker 210.

In some embodiments, voice activated electronic device 10 may be configured to disable adaptive echo cancellation module 220, and more particularly, filter 302. For instance, adaptive echo cancellation may disabled for selected time periods of time, such as during speech time interval 18. When adaptive echo cancellation module is disabled, filter 302 may continue to filter output audio data 300, however upon enablement of adaptive echo cancellation module, filter 302 may again start adapting using feedback. Persons of ordinary skill in the art will recognize that the aforementioned configuration of adaptive echo cancellation module 220 is merely exemplary.

Figure 4:
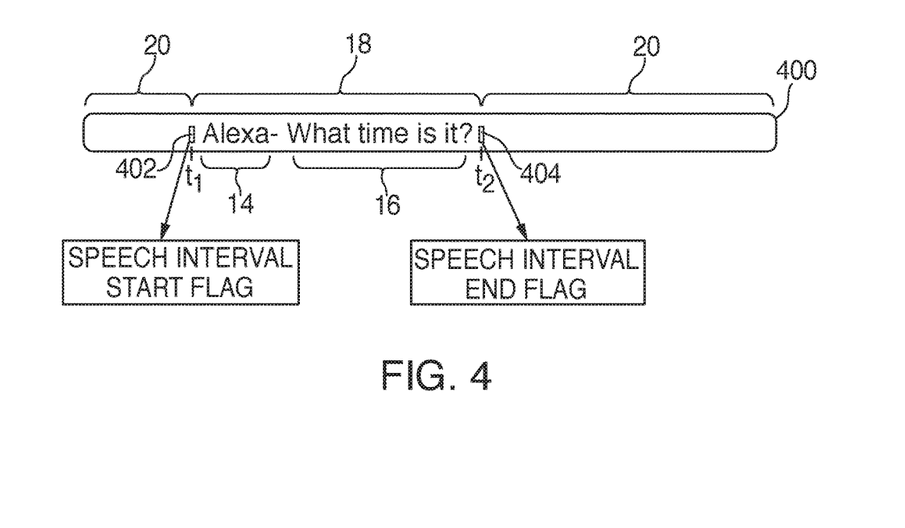
FIG. 4 is an illustrative diagram of setting a speech interval start flag and end flag, in accordance with various embodiments.

FIG. 4 is an illustrative diagram of setting a speech interval start flag and end flag, in accordance with various embodiments. A representation of audio data 400 received by voice activated electronic device is shown in FIG. 4. Audio data 400 includes speech time interval 18 beginning at a first time $t_1$ and ending at a second time $t_2$. The first time $t_1$ and the second time $t_2$ are respectively determined by voice activated electronic device 10 and backend system 100, as described previously described. Voice activated electronic device 10 may disable adaptive echo cancellation module 220 during speech time interval 18. To facilitate identifying speech interval 18, voice activated electronic device 10 may generate first metadata associated with a temporal location of the beginning of wakeword 14 being uttered within audio data 400. For example, voice activated electronic device 10 may generate and place speech interval start flag 402 at a temporal location corresponding to first time $t_1$ in audio data 400. Furthermore, in some embodiments, voice activated electronic device 10 and/or backend server 100 may generate second metadata associated with a temporal location of the end of question 16 being uttered within audio data 400. For example, backend server 100 may generate and place speech interval end flag 404 at a location corresponding to the second time $t_2$ in audio data 400.

Figure 5:
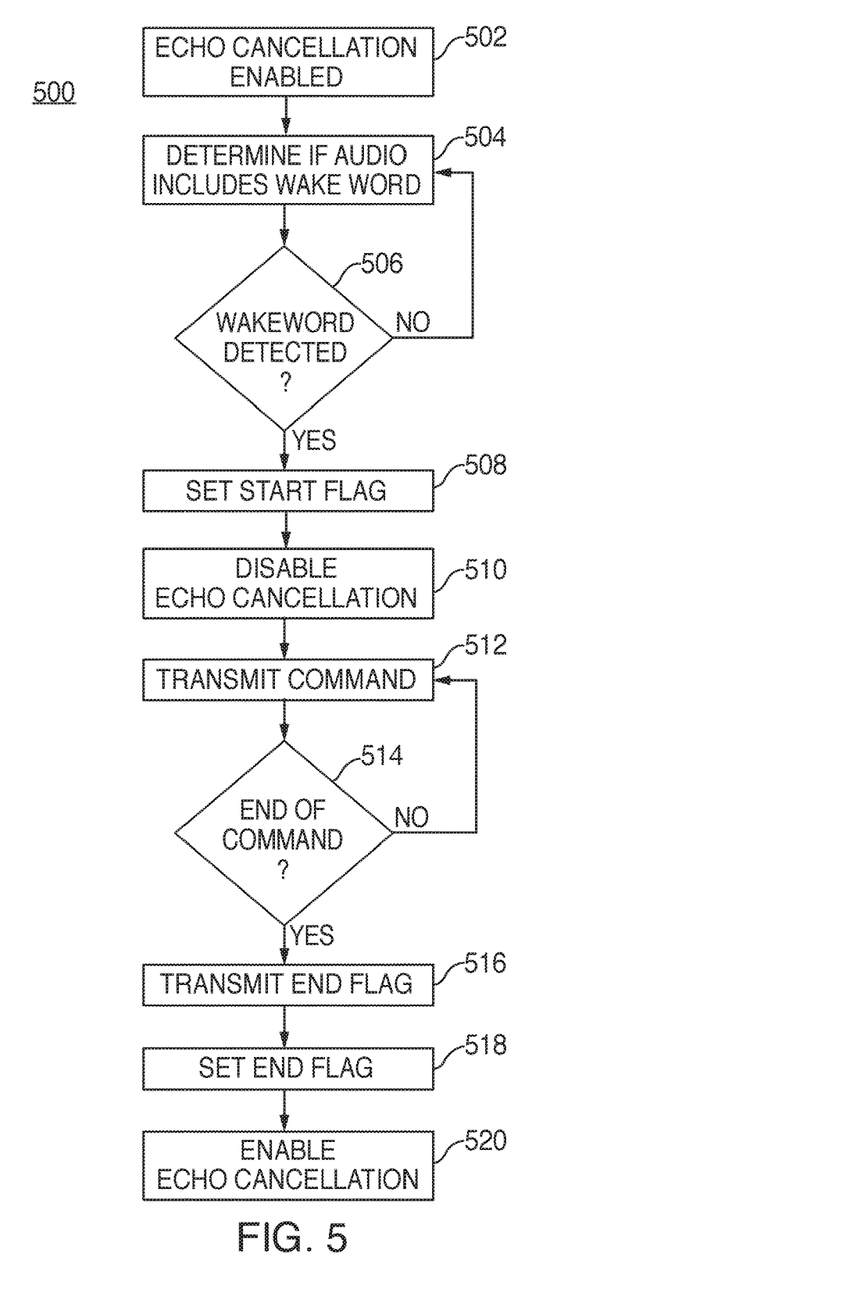
FIG. 5 is an illustrative flowchart of a process for disabling adaptive echo cancellation during a speech time interval in accordance with various embodiments.

FIG. 5 is an illustrative flowchart of a process for disabling adaptive echo cancellation during a speech time interval in accordance with various embodiments. Process 500 may begin at step 502. At step 502, adaptive echo cancellation for voice activated electronic device 10 may be enabled. In some embodiments, voice activated electronic device 10 may, by default, have adaptive echo cancellation enabled. However, in one embodiment, an individual operating voice activated electronic device 10 may enable adaptive echo cancellation at step 502.

At step 504, audio data may be received by one or more audio input components of voice activated electronic device 10. The audio data, for example, may be received by microphone(s) 208. At step 506, voice activated electronic device 10 determines whether the audio data includes an utterance of wakeword 14. Wakeword detector 218 included in voice activated electronic device 10 may be used to detect wakeword 14. If, at step 506, it is determined that the received audio data does not include an utterance of wakeword 14, then process 500 may return to step 504 where audio data may continue to be monitored for utterances of wakeword 14. If, however, wakeword 14 is determined to have been uttered within the received audio data, then process 500 may proceed to step 508.

At step 508, voice activated electronic device 10 may determine a start time corresponding to a beginning of wakeword 14 being uttered within the received audio data (e.g., a temporal location in audio data 400 where wakeword 14 begins), and may place speech interval start flag 402 at that temporal location. At step 510, voice activated electronic device 10 may disables adaptive echo cancellation module 220 beginning at a start time corresponding to the beginning of wakeword 14 being uttered (e.g. a temporal location of the speech interval start flag 402). Although voice activated electronic device 10 may detect wakeword 14 at a time after the beginning of wakeword 14 is uttered, it will be appreciated by those having ordinary skill in the art that a data buffer may be used with adaptive echo cancellation module 220 so that adaptive echo cancellation module 220 may be disabled from the beginning of the utterance of wakeword 14 within audio data 400.

At step 512, voice activated electronic device 10 may transmits audio data corresponding to question 16 to backend system 100. For example, the audio data representing question 16 may be transmitted from voice activated electronic device 10 to backend system 100 using any of the aforementioned communications protocols. At step 514, backend system 100 may analyze the audio data to determine time corresponding to an end of question 16 being uttered (e.g., a temporal location in audio data 400 where question 16 ends). At step 516, backend system 100 may transmit information regarding to the end time in order to set speech interval end flag 404 within audio data 400 to voice activated electronic device 10.

After voice activated electronic device 10 receives speech interval end flag 404, it places speech interval end flag 404 within audio data 400 at step 518. At step 520, voice activated electronic device 10 may again enable adaptive echo cancellation module 220 at a time after the end of question 16 (e.g., at or after the temporal location of speech interval end flag 404) and adaptive echo cancellation module 220 may resume its adaptation. However, since adaptive echo cancellation module 220 was disabled during speech interval 18, wakeword 14 and question 16 may have been excluded in the adaptation, to avoid causing divergence.

Figure 6:
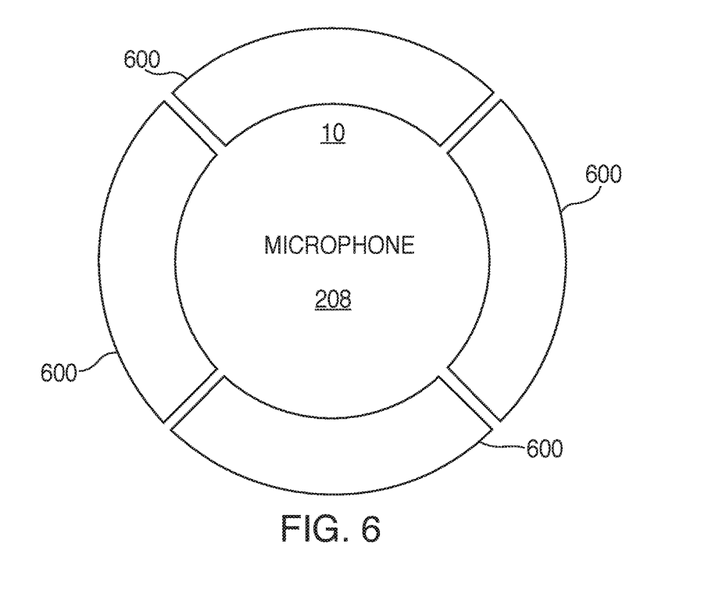
FIG. 6 is an illustrative diagram of a voice activated electronic device forming multiple beams in accordance with various embodiments.

FIG. 6 is an illustrative diagram of a voice activated electronic device forming multiple beams in accordance with various embodiments. In some embodiments, voice activated electronic device 10 includes multiple microphones 208 and is thus able to form multiple beams 600. Constructive and destructive interference due to multiple instances of microphones 208 may cause one or more beams 600 to be generated, each having an associated gain pattern. When audio is received by voice activated electronic device 10, the audio data corresponding to each beam may be different due to the different gain patterns of beams 600. For example, if individual 2 speaks command 4 to voice activated electronic device 10, the sounds of the speech will primarily come from a direction associated with a location of individual 2. Beams 600 that may, therefore, be pointing toward individual 2 (e.g., have higher gains in the direction of individual 2) will more clearly capture the sound of the speech over background noise.

Voice activated electronic device 10 may capture audio data for each of beams 600. However, voice activated electronic device 10 may transmit just one set of audio data to backend system 100 for analysis. Audio data corresponding to beams 600 that are pointed at individual 2 may be selected as opposed to audio data from beams 600 that are pointed away from individual 2. However, the location of individual 2 is not known and can regularly change. In some embodiments, voice activated electronic device 10 may be configured to determine multiple signal to noise ratios, each corresponding to one of the beams 600 and to determine which of the signal to noise ratios has the highest value. Voice activated electronic device 10 may select the beam 600 associated with the highest signal to noise ratio and send the audio data associated with the selected beam 600 to backend system 100. Also, in some embodiments, voice activated electronic device 10 may be configured to determine multiple signal to noise ratios, each corresponding to one of the beams 600 and determine multiple weightings each being associated with one of the beams 600 and being based on the signal to noise ratios associated with the beams 600. Voice activated electronic device 10 may generate weighted composite data by combining and weighting audio data corresponding to two or more of the beams 600 (e.g. combining and weighting audio data corresponding to all of the beams 600) using the determined weightings. Voice activated electronic device 10 may also send the weighted composite audio data to backend system 100.

Figure 7:
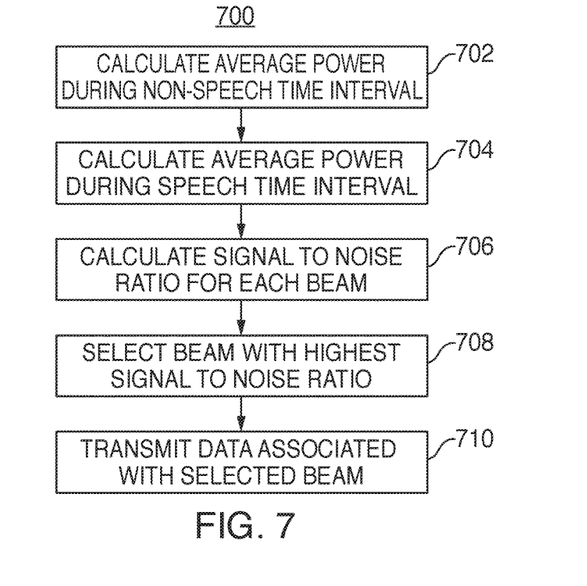
FIG. 7 is an illustrative flowchart of a process for selecting one or more beams in accordance with various embodiments.

FIG. 7 is an illustrative flowchart of a process for selecting one or more beams in accordance with various embodiments. Voice activated electronic device 10 may recognize speech time interval 18 and non-speech time intervals 20, as described previously with respect to FIG. 1. At step 702, voice activated electronic device 10 may calculate the average power of the audio data corresponding to one or more of the beams 600 during non-speech time intervals 20. The average power of the audio data during non-speech time intervals 20 may be representative of noise including, for example, ambient sounds in the local environment where voice activated electronic device 10 is located. In some embodiments, the average power is calculated as a moving average power.

At step 704, voice activated electronic device 10 may calculate the average power of audio data corresponding to one or more of the beams 600 during speech time interval 18. The average power of the audio data during speech interval 18 may be representative of the audio signal (e.g. the speech) combined with ambient noise. In some embodiments, the average power may be calculated as a moving average power. At step 706, voice activated electronic device 10 may determine a signal to noise ratio of the audio data corresponding to one or more of the beams 600. The signal to noise ratio may, for example, correspond to a ratio of the average power of the audio data corresponding to each of beams 600 during the speech time interval 18 as compared to the average power of the audio data corresponding to each of beams 600 during the non-speech time interval 20.

At step 708, voice activated electronic device 10 may select one or more beams 600 whose corresponding audio data has the highest signal to noise ratio among the calculated signal to noise ratios. A higher signal to noise ratio may be indicative of that beam or beams 600 being directed toward individual who is speaking. At step 710, voice activated electronic device 10 may send the audio data associated with the selected beam(s) 600 to backend system 100. Audio data corresponding to non-selected beams 600 may, in some embodiments, be discarded, however this is merely exemplary, and in other embodiments, the audio data may be stored on backend system 100 and/or on voice activated electronic device 10.

Process 700 for selecting one or more of beams 600 may be repeated regularly throughout speech time interval 18. Similarly, process 700 may be repeated for each subsequent speech time interval 18. Thus, voice activated electronic device 10 may select a different beam or beams 600 when the signal to noise ratio of its associated audio data exceeds the signal to noise ratio of the audio data of a currently selected beam or beams 600. In some embodiments, hysteresis logic may be applied before switching beams 600 as constant switching of beams 600 may alter a quality of the audio data transmitted to backend system 100. For example, when one beam 600 is currently selected, voice activated electronic device 10 may wait until audio data associated with another beam 600 exceeds the signal to noise ratio of the selected beam's audio data by a threshold amount.

Figure 8:
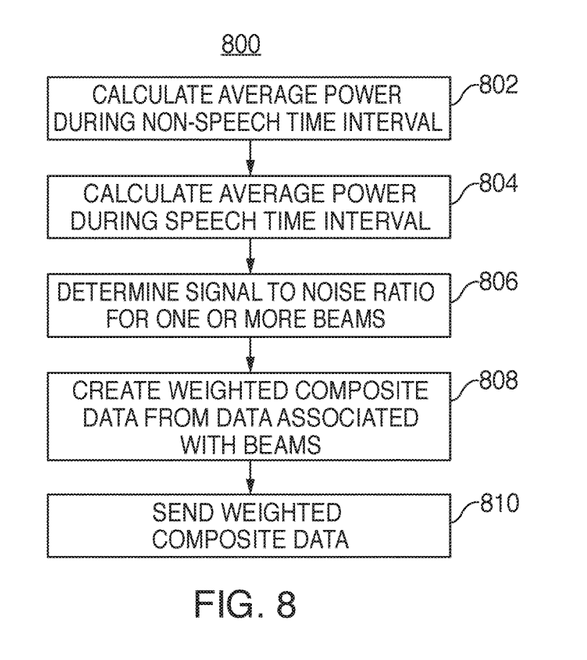
FIG. 8 is an illustrative flowchart of a process for creating composite audio data from audio data associated with multiple beams in accordance with various embodiments.

FIG. 8 is an illustrative flowchart of a process for creating composite audio data from audio data associated with multiple beams in accordance with various embodiments. Process 800 may begin at step 802 where voice activated electronic device 10 may calculate the average power of audio data corresponding to one or more of beams 600 during non-speech time intervals 20. The average power of the audio data during non-speech time intervals 20 may be representative of noise including, for example, ambient sounds in the local environment where the voice activated electronic device 10. In some embodiments, the average power may be calculated as a moving average power.

At step 804, voice activated electronic device 10 may calculate the average power of audio data corresponding to one or more of the beams 600 during speech time interval 18. The average power of the audio data during speech time interval 18 may be representative of the signal (e.g. the speech) combined with the noise. At step 806, voice activated electronic device 10 may determine a signal to noise ratio of the audio data corresponding to one or more of beams 600. The signal to noise ratio may, for example, correspond to a ratio of the average power of the audio data of beams 600 during speech time interval 18 as compared to an average power of the audio data of beams 600 during non-speech time intervals 20.

At step 808, voice activated electronic device 10 may create weighted composite audio data. Weighted composite audio data may be weighted based on a signal to noise ratio of the audio data of each of beams 600. As an illustrative example, audio data of beams 600, whose signal to noise ratio may have a higher weight in the composite audio data, whereas audio data of beams 600 whose signal to noise ratio is lower may have a lower weight in the composite audio data. At step 810, voice activated electronic device 10 may send the weighted composite audio data to backend system 100. For example, voice activated electronic device 10 may send the weighted audio data to backend system 100 using any of the aforementioned communications protocols.

Figure 9:
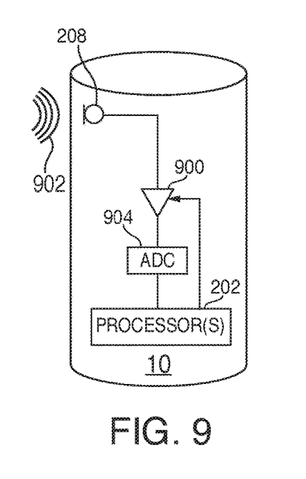
FIG. 9 is an illustrative flowchart of an electronic device including a programmable gain amplifier in accordance with various embodiments.

FIG. 9 is an illustrative diagram of an electronic device including a programmable gain amplifier in accordance with various embodiments. Programmable gain amplifier 900, in some embodiments, may be electrically connected to microphone 208 such that it receives an analog signal from microphone 208. The analog signal may correspond to an analog representation of audio 902 received by microphone 208. Programmable gain amplifier 900 may amplify the analog signal and output the amplified signal to be converted into digital audio data by an analog to digital converter (ADC) 904. ADC 904 may be included in processor 202 or other circuitry for performing analog to digital conversion. Programmable gain amplifier 900 may have an associated controllable gain that may be electronically controlled by, for example, processor 202.

If the level of the signal output from programmable gain amplifier 900 is too high, it can cause ADC 904 to saturate. Saturation of ADC 904 means that the analog signal exceeds the maximum value processable by a digital converter. Thus, ADC 904 will assign the maximum value to the analog signal for the duration it is saturated and will not accurately capture and convert fluctuations in the analog signal. Saturation of ADC 904 reduces the quality of the audio data and can make it more difficult to detect an utterance of wakeword 14 and/or analyze the utterance of question 16.

If the level of the signal output from programmable gain amplifier 900 is too low, ADC 904 may not be able to accurately capture fluctuations of the analog signal. The analog to digital converter has a limited fidelity, so if fluctuations in the analog signal are too small, they may all be converted to a same digital value. To remedy this, the analog signal may be amplified to increase fluctuations such that they are distinguished by ADC 904. However, if the analog signal is amplified too much, it can result in saturating the analog to digital converter as described above.

Controlling the gain of programmable gain amplifier 900 may affect the outputted analog signal. The gain of programmable gain amplifier 900 may be controlled by processor 202 to primarily stay within a selected range in order to prevent saturation of ADC 904. In some embodiments, processor 202 may monitor the analog signal output from programmable gain amplifier 900 and calculates the peak to average ratio ("PAR") of the signal. The PAR of the signal exceeding an upper threshold level can indicate that the analog to digital converter is saturated or at risk of saturating. When the PAR of the signal exceeds the threshold value, processor 202 may reduce a value of the gain of programmable gain amplifier 900. Similarly, when the PAR of the signal falls below a lower threshold level, processor 202 may increase a value the gain of programmable gain amplifier 900. Thus, processor 202 may control programmable gain amplifier 900 to keep the analog signal it outputs at levels that will not saturate ADC 904.

Figure 10:
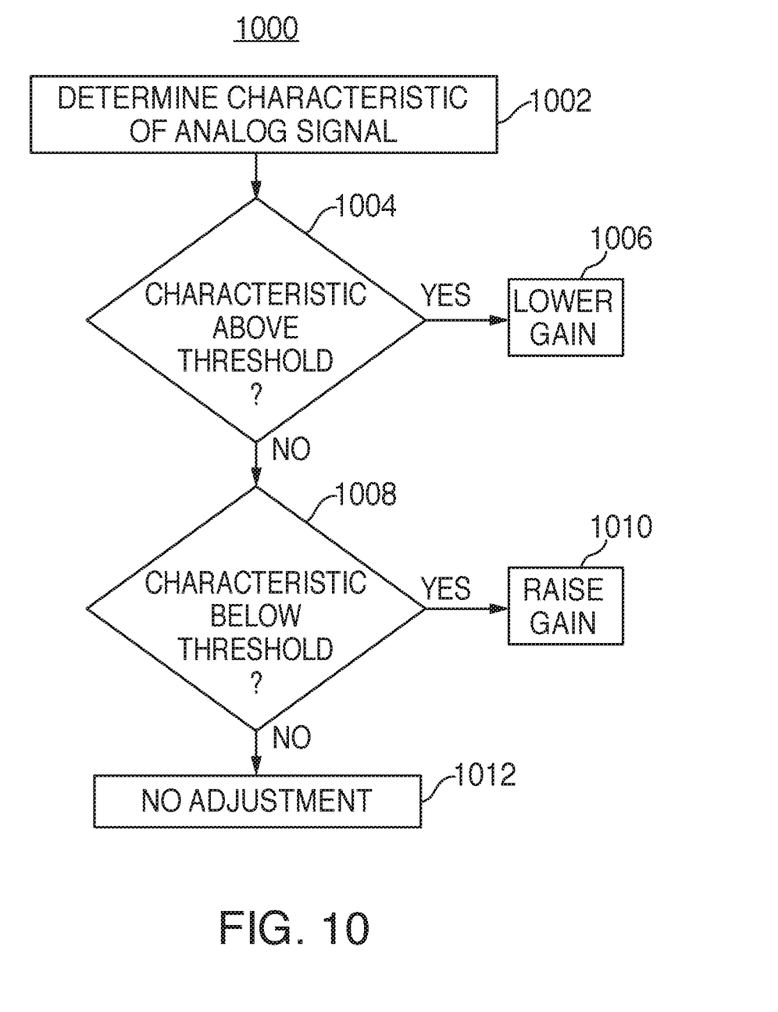
FIG. 10 is an illustrative flowchart of a process for adjusting a gain of a programmable gain amplifier, in accordance with various embodiments.

FIG. 10 is an illustrative flowchart of a process for adjusting the gain of a programmable gain amplifier, in accordance with various embodiments. At step 1002, processor 202 may determine a characteristic of an analog signal output from programmable gain amplifier 900. In particular, processor 202 may monitor and determine at least one characteristic of the analog signal such as, for example, the PAR of the signal. At step 1004, processor 202 may determine whether the characteristic of the signal is above an upper threshold. In some embodiments, the characteristic is the PAR of the signal and the upper threshold may be 6 dB. However, it will be appreciated by those having ordinary skill in the art that other characteristics and threshold levels may be selected without departing from the scope of the disclosed concept.

If it is determined that the characteristic is above the upper threshold, the process 1000 proceeds to step 1006. At step 1006, processor 202 may control programmable gain amplifier 900 to reduce a value of its gain by a predetermined amount. The predetermined amount may be any suitable amount. If it is determined that the characteristic is below the upper threshold, the process 1000 proceeds to step 1008.

At step 1008, processor 202 may determine whether the characteristic of the signal is below a lower threshold. In some embodiments, the characteristic is the PAR of the signal and the lower threshold may be 5 dB. However, it will be appreciated by those having ordinary skill in the art that other characteristics and threshold levels may be selected without departing from the scope of the disclosed concept.

If it is determined that the characteristic is below the lower threshold, the process 1000 proceeds to step 1010. At step 1010, processor 202 may control programmable gain amplifier 900 to increase a value of its gain by a predetermined amount. The predetermined amount may be any suitable amount. If it is determined that the characteristic is above the lower threshold, process 1000 proceeds to step 1012. At step 1012, processor 202 determines that no adjustment to a value of the gain of programmable gain amplifier 900 is needed. Process 1000 may be repeated at regular intervals such as, for example, 300 ms time intervals.

The various embodiments of the invention may be implemented by software, but may also be implemented in hardware, or in a combination of hardware and software. The invention may also be embodied as computer readable code on a computer readable medium. The computer readable medium may be any data storage device which may thereafter be read by a computer system.

The above described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific feature are disclosed as illustrative forms of implementing the claims.

What is claimed is:

1. A method for selectively disabling adaptation of adaptive echo cancellation in a voice activated electronic device, the method comprising:
   receiving, at a first microphone of the voice activated electronic device, audio data having a first portion representing a wakeword and a second portion representing a beginning of speech following the wakeword;
   sending the audio data to a remote system;
   determining that the first portion of the audio data represents the wakeword;
   determining a start time of the first portion by determining an initial time that the voice activated electronic device detected the wakeword;
   disabling adaptive echo cancellation functionality at the start time such that acoustic echo filter coefficients of adaptive echo cancellation functionality do not update in response to the wakeword;
   receiving, from the remote system, an end time identifier indicating that the remote system determined that the audio data no longer represents speech;
   determining that the end time identifier indicates an end time of the second portion; and
   enabling the adaptive echo cancellation functionality at the end time such that acoustic echo filter coefficients update additional speech detected by the first microphone.

2. The method of claim 1, wherein sending the audio data to the remote system further comprises:
   determining a first intensity of the audio data received by the first microphone during a temporal window;
   determining a second intensity of additional audio data received by a second microphone of the electronic device during the temporal window;
   determining that the first intensity is greater than the second intensity; and
   selecting the audio data received by the first microphone to be sent to the remote system.

3. The method of claim 1, further comprising:
   determining a first intensity of the audio data received by the first microphone during a temporal window;
   determining a second intensity of additional audio data received by a second microphone of the electronic device during the temporal window;
   determining a first weighting for the audio data received by the first microphone based on a ratio of the first intensity to the second intensity;
   determining a second weighting for the additional audio data received by the second microphone based on the ratio;
   generating weighted composite audio data by combining the audio data and the first weighting with the additional audio data and the second weighting; and
   sending the weighted composite audio data to the remote system.

4. The method of claim 1, further comprising:
   receiving an analog signal from a programmable gain amplifier;
   performing an analog to digital conversion on the analog signal to create the audio data;
   determining a peak to average ratio of the audio data;
   determining that the peak to average ratio of the audio data is above an upper threshold; and
   generating a new value for a gain of the programmable gain amplifier that is lower than a previous value of the gain of the programmable gain amplifier.

5. A method, comprising:
   receiving, at an electronic device, audio data representing an audible sound;
   determining that the audio data includes a first portion that enables functionality of the electronic device;
   determining a first time corresponding to a start of the first portion;
   causing, at the first time, echo cancellation functionality to be disabled;
   receiving information indicating a second time corresponding to an end of the audible sound; and
   causing, at the second time, the echo cancellation functionality to be enabled.

6. The method of claim 5, further comprising:
   sending the audio data to a remote electronic device such that the remote electronic device provides the information indicating the second time to the electronic device.

7. The method of claim 5, further comprising:
   generating first metadata associated with the first time;
   generating second metadata associated with the second time; and
   sending the first metadata and the second metadata to a remote electronic device.

8. The method of claim 5, further comprising:
   determining beam audio data associated with a plurality of beams, the beam audio data including first beam audio data and second beam audio data;
   determining a first signal to noise ratio associated with the first beam audio data;
   determining a second signal to noise ratio associated with the second beam audio data;
   determining that the first signal to noise ratio is preferred over the second signal to noise ratio; and
   sending the first beam audio data to a remote electronic device.

9. The method of claim 5, further comprising:
   determining beam audio data associated with a plurality of beams, the beam audio data including first beam audio data and second beam audio data;
   determining a first signal to noise ratio associated with the first beam audio data;
   determining a second signal to noise ratio associated with the second beam audio data;
   determining, based on the first signal to noise ratio, a first weight value associated with the first beam audio data;
   determining, based on the second signal to noise ratio, a second weight value associated with the second beam audio data;
   generating weighted composite audio data, wherein the weighted composite audio data is generated based on the first beam audio data, the first weight value, the second beam audio data and the second weight value; and sending the weighted composite audio data to a remote electronic device.

10. The method of claim 5, further comprising:
receiving an analog signal from an amplifier of the electronic device;
generating the audio data by performing an analog to digital conversion to the analog signal;
determining a characteristic of the audio data; and
determining a gain for the amplifier based on the characteristic.

11. The method of claim 10, wherein determining the characteristic comprises:
determining a peak to average ratio of the audio data.

12. The method claim 11, further comprising:
determining that the peak to average ratio of the audio data is greater than a threshold ratio value; and
generating a new gain for the amplifier that is less than the gain.

13. An electronic device, comprising:
at least one audio input device that receives audio data representing an audible sound;
communications circuitry operable to communicate with a remote electronic device;
at least one processor; and
memory including instructions operable to be executed by the at least one processor to perform a set of actions to configure the device to:
determine that the audio data includes a first portion that enables functionality of the electronic device;
determine a first time corresponding to a start of the first portion;
cause, at the first time, echo cancellation functionality to be disabled;
receive information indicating a second time corresponding to an end of the audible sound; and
cause, at the second time, the echo cancellation functionality to be enabled.

14. The electronic device of claim 13, wherein the at least one processor is further operable to:
send the audio data to the remote electronic device such that the remote electronic device provides the information indicating the second time to the electronic device.

15. The electronic device of claim 13, wherein the device is further configured to:
generate first metadata associated with the first time;
generate second metadata associated with the second time; and
send the first metadata and the second metadata to the remote electronic device.

16. The electronic device of claim 13, wherein the device is further configured to:
determine beam audio data associated with a plurality of beams, the beam audio data including first beam audio data and second beam audio data;
determine a first signal to noise ratio associated with the first beam audio data;
determine a second signal to noise ratio associated with the second beam audio data;
determine that the first signal to noise ratio is preferred over the second signal to noise ratio; and
send the first beam audio data to the remote electronic device.

17. The electronic device of claim 13, wherein the device is further configured to:
determine beam audio data associated with a plurality of beams, the beam audio data including first beam audio data and second beam audio data;
determine a first signal to noise ratio associated with the first beam audio data;
determine a second signal to noise ratio associated with the second beam audio data;
determine, based on the first signal to noise ratio, a first weight value associated with the first beam audio data;
determine, based on the second signal to noise ratio, a second weight value associated with the second beam audio data;
generate weighted composite audio data, wherein the weighted composite audio data is generated based on the first beam audio data, the first weight value, the second beam audio data and the second weight value; and
send the weighted composite audio data to the remote electronic device.

18. The electronic device of claim 13, wherein the device is further configured to:
receive an analog signal from an amplifier of the electronic device;
generate the audio data by performing an analog to digital conversion to the analog signal;
determine a characteristic of the audio data; and
determine a gain for the amplifier based on the characteristic.

19. The electronic device of claim 18, wherein the device is further configured to:
determine a peak to average ratio of the audio data.

20. The electronic device of claim 19, wherein the device is further configured to:
determine that the peak to average ratio of the audio data is greater than a threshold ratio value; and
generate a new gain for the amplifier that is less than the gain.

* * * * *